United States Patent
Reichelt et al.

(10) Patent No.: US 10,066,524 B2
(45) Date of Patent: Sep. 4, 2018

(54) OIL-SEPARATING DEVICE, IN PARTICULAR FOR A CRANKCASE VENTILATION SYSTEM OF AN INTERNAL COMBUSTION ENGINE

(71) Applicant: THYSSENKRUPP PRESTA TECCENTER AG, Eschen (LI)

(72) Inventors: Robert Reichelt, Frankenberg (DE); Ulf Müller, Chemnitz (DE); Jürgen Meusel, Dittmannsdorf (DE); Ingo Jokisch, Dresden (DE)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 70 days.

(21) Appl. No.: 14/898,045

(22) PCT Filed: Jun. 16, 2014

(86) PCT No.: PCT/EP2014/001625
§ 371 (c)(1),
(2) Date: Dec. 11, 2015

(87) PCT Pub. No.: WO2014/202198
PCT Pub. Date: Dec. 24, 2014

(65) Prior Publication Data
US 2016/0138445 A1    May 19, 2016

(30) Foreign Application Priority Data

Jun. 18, 2013   (DE) .................. 10 2013 106 332

(51) Int. Cl.
*B01D 39/00*    (2006.01)
*F01M 13/04*    (2006.01)
(Continued)

(52) U.S. Cl.
CPC ......... *F01M 13/04* (2013.01); *B01D 39/1623* (2013.01); *B01D 45/12* (2013.01);
(Continued)

(58) Field of Classification Search
CPC ........... F01M 13/04; F01M 2013/0433; F01M 2013/0438; F01M 2013/0422;
(Continued)

(56) References Cited

U.S. PATENT DOCUMENTS 3,641,745 A    2/1972 Moore
3,722,185 A *  3/1973 Miczek .................. B01D 45/12
                                                    261/109
(Continued)

FOREIGN PATENT DOCUMENTS

CN    201116481 Y    9/2008
CN    102852593 A    1/2013
(Continued)

OTHER PUBLICATIONS

English abstract for DE102008044857.
(Continued)

*Primary Examiner* — Dung H Bui
(74) *Attorney, Agent, or Firm* — Lathrop Gage L.L.P.

(57) ABSTRACT

An oil-separating device for crankcase ventilation of an internal combustion engine may include a hollow member that extends axially in a longitudinal axis and through which a gas flow charged with oil can flow. The gas flow may flow against an oil separation ring disposed within or formed in the hollow member. The hollow member may contain a substantially rotationally symmetrical flow guiding member that has a flow projection located in the longitudinal axis and that has a flow contour that radially increases in a downstream direction so that gas can flow around the flow guiding member and so that the gas flow between the flow contour
(Continued)

and the inner side of the hollow member can strike the oil separation ring in an accelerated manner.

9 Claims, 3 Drawing Sheets

(51) Int. Cl.
    *B01D 45/12*     (2006.01)
    *F01L 1/047*     (2006.01)
    *B01D 39/16*     (2006.01)
    *B01D 46/00*     (2006.01)
    *B04C 3/06*     (2006.01)
    *B04C 3/00*     (2006.01)
    *B04C 3/04*     (2006.01)

(52) U.S. Cl.
CPC .......... *B01D 46/0039* (2013.01); *F01L 1/047* (2013.01); *B04C 3/00* (2013.01); *B04C 3/04* (2013.01); *B04C 3/06* (2013.01); *F01L 2001/0475* (2013.01); *F01M 2013/0422* (2013.01); *F01M 2013/0433* (2013.01); *F01M 2013/0438* (2013.01)

(58) Field of Classification Search
CPC ............ B01D 39/1623; B01D 46/0039; B01D 45/12; F01L 1/047; F01L 2001/0475; B04C 3/06; B04C 3/00; B04C 3/04
See application file for complete search history.

(56) References Cited

U.S. PATENT DOCUMENTS

| 3,915,679 | A | 10/1975 | Roach et al. | |
|---|---|---|---|---|
| 6,354,283 | B1* | 3/2002 | Hawkins | F01M 13/04 123/572 |
| 2009/0100811 | A1* | 4/2009 | Scheckel | B01D 45/08 55/448 |
| 2009/0288560 | A1* | 11/2009 | Ruppel | F01M 13/04 96/408 |
| 2011/0036242 | A1* | 2/2011 | Enderich | B01D 45/04 96/400 |
| 2011/0312427 | A1* | 12/2011 | Meusel | F01L 1/047 464/183 |
| 2012/0031276 | A1* | 2/2012 | Meusel | F01L 1/047 96/400 |

FOREIGN PATENT DOCUMENTS

| DE | 10 2005 042 720 A1 | 4/2006 |
|---|---|---|
| DE | 102008044857 A | 8/2010 |
| DE | 10 2009 012 400 A1 | 9/2010 |
| EP | 2 597 277 A1 | 5/2013 |
| JP | 60173614 | 11/1985 |

OTHER PUBLICATIONS

English abstract for CN102852593.
English abstract for CN201116481.
German Language International Search Report for International patent application No. PCT/EP2014/001625; dated Sep. 19, 2014.
English translation of International Search Report for International patent application No. PCT/EP2014/001625; dated Sep. 19, 2014.
English translation of the abstract of EP 2 597 277 A1.
English translation of the abstract of DE 10 2005 042 720 A1.
Japanese Application No. 2016-520307, Notice of Rejection, dated Jan. 30, 2018, 8 pages.

\* cited by examiner

OIL-SEPARATING DEVICE, IN PARTICULAR FOR A CRANKCASE VENTILATION SYSTEM OF AN INTERNAL COMBUSTION ENGINE

CROSS REFERENCE TO RELATED APPLICATIONS

This application is a U.S. National Stage Entry of International Patent Application Serial Number PCT/EP2014/001625, filed Jun. 16, 2014, which claims priority to German Patent Application No. DE 102013106332.2 filed Jun. 18, 2013, the entire contents of both of which are incorporated herein by reference.

FIELD

The present disclosure relates to oil-separating devices and, more particularly, to the ventilation of crankcases of internal combustion engines.

BACKGROUND

In internal combustion engines and piston compressors, there are in practice observed leakage losses which may be attributed to an incomplete sealing, for example, of the piston/cylinder path or the valve guides in the cylinder head. The leakage losses are referred to as blowby gas and contain a substantial amount of oil. With respect to internal combustion engines, it is therefore conventional to direct the blowby gas which occurs during operation of the internal combustion engine back into the intake tract of the internal combustion engine. In order, on the one hand, to minimize the oil loss as a result of the blowby gas and, on the other hand, to ensure optimum combustion and minimal environmental damage, it is known to supply the blowby gas to an oil separator and to direct the separated oil back into the oil circuit. In this instance, it is sought to configure corresponding oil separation systems to be as simple as possible but nevertheless to be reliable and efficient. Another aspect for improving oil separators relates to a minimal flow resistance to which the gas flow is subjected when the oil separator is flowed through. However, a high separation capacity is necessary in order to minimize the output of residual oil in the charge air tract, in particular in order to prevent air mass measuring members and turbochargers from becoming fouled by oil.

DE 10 2009 012 400 A1 sets out an oil separator which is suitable for crankcase ventilation of an internal combustion engine. The oil separator has as the housing a hollow member which can be formed, for example, by a portion of a camshaft or the hollow member is constructed to be tubular and is integrated in a cylinder head cover of an internal combustion engine. A torsion generator is arranged in the hollow member and the hollow member has an end-side supply opening for introducing the gas flow and a discharge opening for discharging the gas flow. The gas flow introduced into the hollow member may also carry oil in the form of oil mist or spray droplets which are intended to be removed from the gas flow by the oil separator. To this end, the hollow space further has a discharge opening which is for discharging separated oil and which is constructed separately from the discharge of the gas flow which has been purged of oil.

In principle, oil separators use a torsion effect which can be used in a particularly advantageous manner when the oil separator is formed in a rotating camshaft which forms the hollow member of the oil separator. To this end, in DE 10 2009 012 400 A1 there is formed in the hollow member a torsion generator which has a plurality of helical flow channels and through which a torsion is introduced into the gas flow which is charged with oil. As a result of the associated change in the flow direction of the gas flow, oil droplets which are also carried in the gas flow are separated on the inner wall of the hollow member and, as a result of the throughflow of the hollow member in the longitudinal direction, the oil droplets reach the outer region of the oil separation ring, by which the gas flow is separated in the central region of the hollow member from the oil flow in the wall region of the hollow member. Finally, after the oil separation ring has been arranged, the oil can be separated by the discharge opening for the oil from the discharge opening of the cleaned gas flow which is subsequently supplied to the discharge tract of the internal combustion engine or, for example, a piston compressor. In order to form the oil separation ring, it is set out that it can be constructed from a porous plastics material or a sintered material, wherein plastics or metal braided material can also be advantageously used. Such braided materials form a large number of hollow spaces and labyrinth-like formations, whereby the separation of the oil from the gas flow is further promoted. As a result of the torsion, the oil droplets are conveyed radially outward in relation to the longitudinal axis of the hollow member and the gas flow is guided through the central passage in the oil separation ring.

As a result of the rotational movement which is introduced into the gas flow by the torsion generator, there is produced during flow through the oil separator a substantial flow resistance in the gas flow, by which the separation power is again reduced by lower flow rates through the oil separator.

SUMMARY

An object of the invention is to develop an oil-separating device, in particular for the crankcase ventilation of an internal combustion engine, which allows a high separation power of oil from a gas flow and which is particularly developed in that a flow resistance of the gas flow which is as small as possible is produced as a result of the oil-separating device.

This object is achieved on the basis of an oil-separating device in accordance with the preamble of claim 1 in conjunction with the characterizing features. Advantageous developments of the invention are set out in the dependent claims.

The invention includes the technical teaching that there is arranged in the hollow member a substantially rotationally symmetrical flow guiding member which has a flow projection located in the longitudinal axis and which has a flow contour which radially increases in a downstream direction, that is to say, in the flow direction, so that the flow guiding member can be flowed round by the gas flow and so that the gas flow between the flow contour and the inner side of the hollow member can strike the oil separation ring in an accelerated manner.

The arrangement of a flow guiding member according to the invention in the hollow member affords the advantage that a direct flow against the oil separation ring becomes possible without a greater flow resistance being produced as a result of the flow guiding member. The reduced flow resistance is particularly produced in that there do not have to be provided a plurality of helical turns of a torsion generator which first have to be flowed through by the gas flow so that the gas flow charged with oil can strike the oil separation ring only subsequently. The notion of the invention is based in this instance on the provision of an annular gap having a peripheral annular gap height which is formed, for example, between the outer side of the flow guiding member and the inner side of the hollow member so that the oil separation ring can be arranged downstream, that is to say, located in the flow direction, behind the annular gap formed with a given spacing. In particular, a greater wall contact of the gas flow with high flow speeds is prevented, which contact can produce an increased flow resistance. The indication of the arrangement or orientation formed in a downstream direction reproduces in accordance with the present invention only a directional indication which describes a direction which is orientated in or with a possible gas flow direction.

The flow contour of the flow guiding member can be constructed, for example, to be convex counter to the gas flow. The convex construction can, for example, be described by a spherical portion or by a rotationally symmetrical ellipse portion which has a front portion for forming the flow projection, and downstream of the flow projection the diameter of the flow contour increases in accordance with the spherical surface or the ellipse surface.

As a result of the construction of the flow guiding member which extends, as does the hollow member itself, substantially symmetrically about the longitudinal axis of the hollow member, it is possible for a peripheral flow cross-section region having a radial flow cross-section width to be formed between the radially outer region of the flow guiding member and the inner side of the hollow member. In an advantageous manner, the oil separation ring may have a radial width which corresponds at least to the radial flow cross-section width in the flow cross-section region. In this instance, the flow cross-section region does not have to be constructed in a completely peripheral manner and, for example, retention ribs may be provided between the flow guiding member and the inner side of the hollow member in order to position the flow guiding member centrally in the hollow member, by which ribs the peripheral flow cross-section region can be interrupted. In a similarly advantageous manner, the annular gap can alternatively also be formed by a large number of axial gaps which are constructed at the peripheral side of the flow guiding member and which are in the form of round or elongate openings.

The oil separation ring may be formed, for example, at least partially from a nonwoven material. By using a nonwoven material, the absorption effect for receiving the oil from the gas flow can be further improved, wherein alternatively porous plastics materials or sintered material can also be used to form the oil separation ring. In principle, different types of plastics or metal braided materials or other knitted fabrics prevent contamination of the member which is formed by those materials so that they do not become clogged by oil and in particular by foreign materials in the oil.

In a further advantageous manner, the oil separation ring may have a carrier ring, in which the nonwoven material is at least partially received. In this instance, the oil separation ring and in particular the nonwoven material may be formed in the accelerated gas flow in such a manner that the oil separation ring or the nonwoven material acts as an impactor, which the gas flow can strike so as to separate the oil at the oil separation ring or the nonwoven material. The oil separation ring may be arranged with the outer periphery thereof adjacent to the inner side of the hollow member so that at least a portion of the gas flow can be redirected radially inward by the oil separation ring. However, a remaining, radially formed peripheral gap between the inner side of the hollow member and the oil separation ring is advantageous so that oil droplets which are already formed and precipitated at the end side of the oil separation ring can travel downstream on the inner wall of the hollow member between the hollow member and the oil separation ring. As a result of the impactor effect of the oil separation ring and in particular of the nonwoven material, there is produced a powerful flow direction change of the gas flow which the oil droplets in the gas flow cannot follow. Consequently, the oil droplets remain on the oil separation ring and in particular on the nonwoven material and can travel downstream at the inner side of the hollow member and subsequently be discharged by a corresponding opening in the hollow member. The gas flow purged of the oil can flow through the central passage through the oil separation ring and be supplied to the charge air tract of the internal combustion engine.

According to another aspect of the invention, the nonwoven material may have a gas-permeability which is determined in such a manner that the gas flow can partially flow through the nonwoven material. A good filter effect of the nonwoven material can thereby be used by a portion of the gas flow being directed directly through the nonwoven material, wherein another portion of the gas flow imparts oil to the oil separation ring as a result of the impactor effect at the surface of the oil separation ring, and is redirected in order finally to leave the oil separation ring through the central passage. There is thereby produced in particular the positive side-effect of a reduction of the pressure loss over the total system of the oil-separating device because downstream of the flow cross-section region a larger total cross-section is available for the gas flow. The increase of the total cross-section is produced, on the one hand, as a result of the region between the flow guiding member and the oil separation ring which can be flowed through by the gas flow in order finally to flow away through the passage in the oil separation ring, and there is further produced a flow cross-section through the nonwoven material. As a result, an oil separation ring particularly comprising a nonwoven material is used, on the one hand, as an impactor in order to obtain oil separation as a result of a sudden redirection of the gas flow path and, on the other hand, the oil separation ring is used as a filter if a portion of the gas flow flows through the oil separation ring and in particular the nonwoven material. In particular at higher flow quantities of gas which is charged with oil, the additional filter effect in the nonwoven material of the oil separation ring can be advantageously used by the oil-separating device. If the oil-separating device is flowed through with a smaller gas flow, an effective oil separation can already be brought about by the impactor effect by the oil separation ring.

According to another advantageous embodiment, there may be provided an additional oil separation member which is arranged in the hollow member so as to be located downstream of the oil separation ring. The additional oil separation member may be formed, for example, in a tubular manner and be fitted in the hollow member. In this instance, the additional oil separation member may comprise a nonwoven material or at least partially comprise a nonwoven material. The additional oil separation member may also act as an impactor or the additional oil separation member is flowed through at least partially by the gas flow so that as already described in connection with the oil separation ring, the additional oil separation member can also separate oil from the gas flow as a result of the impactor effect or additionally as a result of a filter effect.

In order to improve the throughflow of the additional oil separation member, there may be arranged downstream of the flow guiding member a redirection member by which the gas flow is redirected against the inner side of the covering-like additional oil separation member. To this end, an intermediate element can be formed between the oil separation ring and the redirection member, wherein the intermediate element may have radial gaps, through which the gas flow can strike the inner side of the additional oil separation member, in particular in an accelerated manner. The upstream oil separation ring may comprise a nonwoven material which can preferably be used to separate larger oil droplets and the additional oil separation member may comprise a nonwoven material by which smaller oil droplets can be separated. In addition to the oil droplets, foreign bodies, in particular small particulates, can also be separated from the gas flow by the separation members and, for example, the additional oil separation member can separate particulates which are smaller than 1 micrometer and in particular smaller than 0.6 micrometers.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

Figure 1:
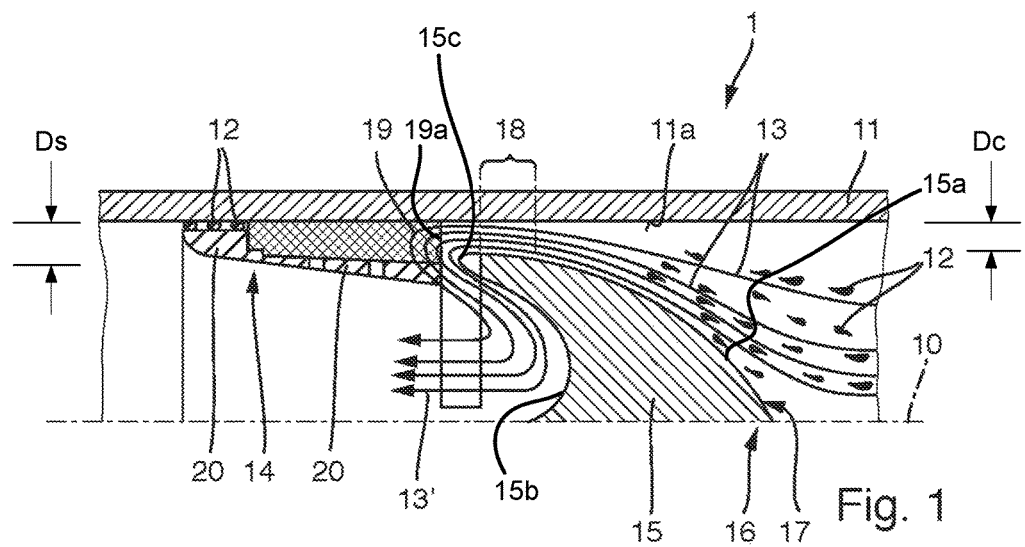
FIG. 1 is a schematic view of an example oil-separating device having an example flow guiding member and an example oil separation ring, wherein a weak gas volume flow charged with oil is shown to be flowing through the oil-separating device.
Figure 2:
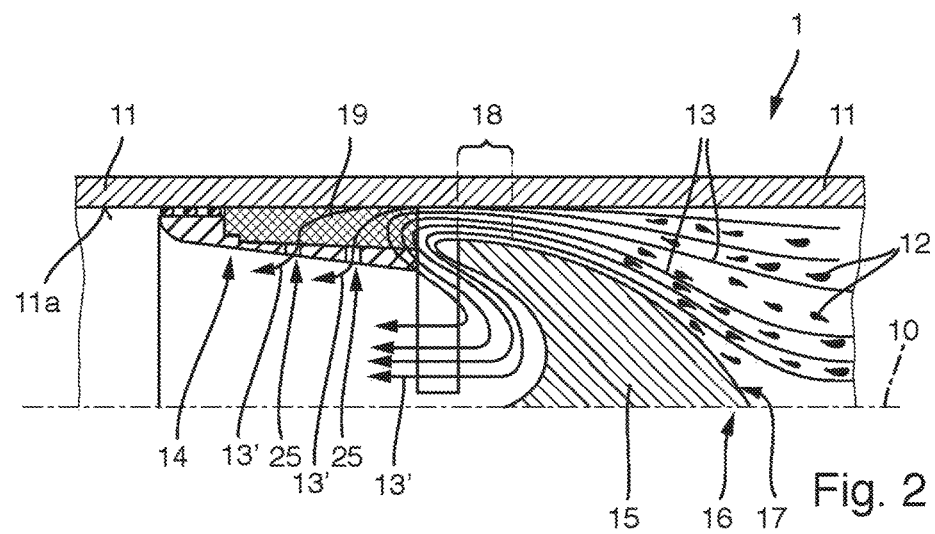
FIG. 2 is a schematic view of the example oil-separating device of FIG. 1, wherein a powerful gas volume flow charged with oil is shown to be flowing through the oil-separating device.

Referring now to the figures, FIGS. 1 and 2 show an oil-separating device 1 according to a first embodiment which can be used to remove oil from a gas flow 13 and which can be used to ventilate a crankcase of an internal combustion engine. The gas flow 13 which flows into the oil-separating device 1 is charged with oil 12, wherein the oil 12 is shown by way of example in droplet form and the oil 12 can also be present as oil mist or as spray oil. Furthermore, foreign bodies can be carried in the gas flow 13 in the form of small particulates which can also be separated from the gas flow 13 by the oil-separating device 1. In FIG. 1, the oil-separating device 1 is shown with a more weakly formed gas flow 13 and FIG. 2 shows the oil-separating device 1 which is flowed through by a more powerful gas flow 13.

The oil-separating device 1 comprises as a housing a hollow member 11 which is constructed in a tubular manner so as to extend axially along a longitudinal axis 10 and the hollow member 11 may form a portion of a camshaft of the internal combustion engine which can be constructed as a hollow camshaft in fitted form. In this instance, the gas flow 13 which is charged with oil 12 is introduced into the hollow member 11 in a manner not shown in greater detail and is discharged again from the hollow member 11 at an opposite side, wherein the discharged gas flow 13' is substantially purged of the oil 12.

The oil-separating device 1 has a flow guiding member 15 which is formed in the hollow member 11 and which is flowed against by the gas flow !3 which is charged with oil 12 in the plane of the drawing from the right-hand side. The flow guiding member 15 is constructed by way of example to be rotationally symmetrical about the longitudinal axis 10, wherein the oil-separating device 1 is graphically illustrated only in one half above the longitudinal axis 10 as a result of the rotational symmetry thereof. The flow guiding member 15 has a flow projection 16 and, downstream of the flow projection 16, the flow contour 17 of the flow guiding member 15 increases in such a manner that a convex flow guiding member is formed, wherein the convex front side is directed counter to the flow direction of the gas flow 13. More particularly, as shown in FIG. 1, a flow contour of the flow guide 15 is convex along a first portion 15a and concave along a second portion 15b after a trailing edge 15c of the flow guide 15. The flow guiding member 15 has an outer diameter which is slightly smaller than the diameter of the inner side (or "inner face") 11a of the hollow member 11. A flow cross-section region 18 is thereby produced between the outer flow contour 17 of the flow guiding member 15 and the inner side 11a of the hollow member 11, and an acceleration of the gas flow 13 is produced as a result of the flow constriction in the direction of the flow cross-section region 18 which surrounds the flow guiding member 15. The acceleration of the gas flow 13 is carried out with only a small flow resistance and the accelerated gas flow 13 can flow around the entire periphery of the flow guiding member 15 in order subsequently to abut an oil separation ring 14.

The arrangement of the flow guiding member 15 in the hollow member 11 is only shown schematically and retention ribs or the like may be arranged between the inner side 11a of the hollow member 11 and the flow guiding member 15 at a plurality of peripheral positions in order to receive the flow guiding member 15 centrally in the hollow member 11 without the effect of the flow acceleration in the flow cross-section region 18 being negatively impaired thereby.

The oil separation ring 14 is formed in the hollow member 11 with spacing behind the flow guiding member 15 (i.e., such that trailing edge 15c of the flow guide 15 is entirely upstread of the oil separation ring 14, as shown for example in FIG. 1) so that the accelerated gas flow 13 can initially strike the oil separation ring 14 and wherein the gas flow 13 is redirected at least partially by the oil separation ring 14 radially inward toward the longitudinal axis 10.

The oil separation ring 14 has a nonwoven material 19 and a carrier ring 20, wherein the nonwoven material 19 is retained by the carrier ring 20 at the inner side 11a of the hollow member 11 so that the nonwoven material 19 is located in the striking region of the accelerated gas flow 13; in other words, as shown in FIG. 1, upstream edge 19a of the nonwoven material 19 extends away from the housing inner face 11a a striking distance Ds which is greater than a minimum constriction distance Dc separating the flow guide 15 from the housing inner face 11a.

FIG. 1 shows the oil-separating device 1 which is flowed through with a more weakly formed gas flow 13 and the gas flow 13 is redirected inward in the direction toward the longitudinal axis 10 substantially completely by the nonwoven material 19 of the oil separation ring 14 so as to form an impactor effect. As a result of the inertia of the droplets of oil 12 which are carried with the gas flow 13, the oil remains in the nonwoven material 19, passes through it and travels at the inner side 11a of the hollow member 11 downstream out of the nonwoven material 19. To this end, there is located between the outer side of the oil separation ring 14 and the inner side 11a of the hollow member 11 a gap which allows the oil 12 to be able to travel downstream on the inner side 11a of the hollow member 11. The oil 12 which is introduced with the gas flow 13 into the oil-separating device 1 may be present in the form of oil mist or in the form of smaller droplets, wherein the separated oil 12 which runs along the surfaces of the components can occur in larger droplets and is subsequently supplied to a separation which is not shown without being mixed with the gas flow 13 again.

To this end, in a manner not shown in greater detail the oil 1 can subsequently be discharged out of the hollow member 11 through an oil discharge opening and be supplied in to the separation or the oil circuit of the internal combustion engine. The gas flow 13' which flows centrally through the oil separation ring 14 is in this instance substantially purged of the oil 12 and can be supplied to the charge air tract of the internal combustion engine.

FIG. 2 shows the oil-separating device 1 which is flowed through by a more powerful gas flow 13 and, as already described in connection with FIG. 1, there is located in the hollow member 11 a flow guiding member 15 which has a flow projection 16 and a flow contour 17, and the gas flow 13 charged with oil 12 accelerates into a flow cross-section region 18 which extends between the outer side of the flow guiding member 15 and the inner side 11a of the hollow member 11 in a radially peripheral manner. After the gas flow 13 has passed through the flow cross-section region 18 whose cross-section is determined by the annular ring height, it reaches the nonwoven material 19 of the oil separation ring 14 using an impactor effect, and a portion of the gas flow 13 is redirected inward in the direction toward the longitudinal axis 10, wherein first oil droplets of oil 12 already become separated on the nonwoven material 19. As a result of the more powerful gas flow 13, another portion of the gas flow 13 is introduced into the nonwoven material 19 and the gas flow 13 which is introduced into the nonwoven material 19 is discharged from the carrier ring 20 through discharge openings 25. In this instance, there is produced a cleaned gas flow 13 which has flowed through the nonwoven material 19 of the oil separation ring 14 under a filtering action. The cleaned gas flow 13 is subsequently combined with the cleaned gas flow 13' which has been redirected at the oil separation ring 14 in order finally to be supplied to the charge air tract of the internal combustion engine.

Figure 3:
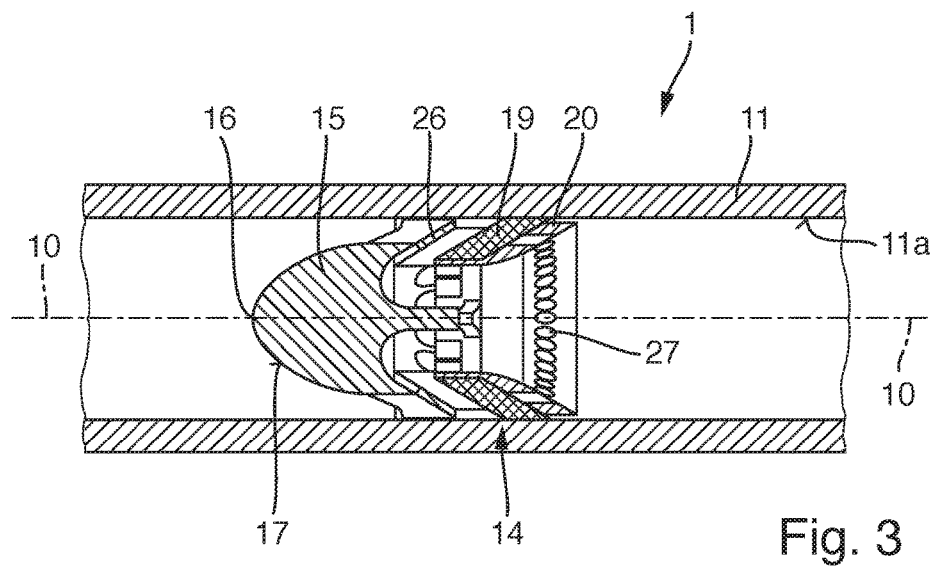
FIG. 3 is a sectional view of an example oil-separating device that has an example flow guiding member and an example oil separation ring.

FIG. 3 shows another variant of an oil-separating device 1 having a flow guiding member 15 which starting from a flow projection 16 located in the longitudinal axis 10 has a substantially parabolically increasing flow contour 17. The flow guiding member 15 is formed coaxially in the hollow member 11 and extends around the longitudinal axis 10 in a substantially rotationally symmetrical manner. The flow guiding member 15 is supported via retention ribs 26 centrally against the inner side 11a of the hollow member 11 so that the retention ribs 26 can be flowed around by the gas flow which is not illustrated, without the retention ribs 26 forming a significant flow resistance.

Downstream of the flow guiding member 15, there is arranged downstream an oil separation ring 14 having a nonwoven material 19 and a carrier ring 20, wherein a plurality of through-openings 27 through which oil which is separated on the nonwoven material 19 can pass are arranged in a distributed manner so as to be distributed over the periphery 20 in the carrier ring, in order to be supplied finally to a separation opening (not shown in greater detail). The nonwoven material 19 is retained by the carrier ring 20, wherein the carrier ring 20 is constructed integrally with the flow guiding member 15 in accordance with the embodiment shown.

Figure 4:
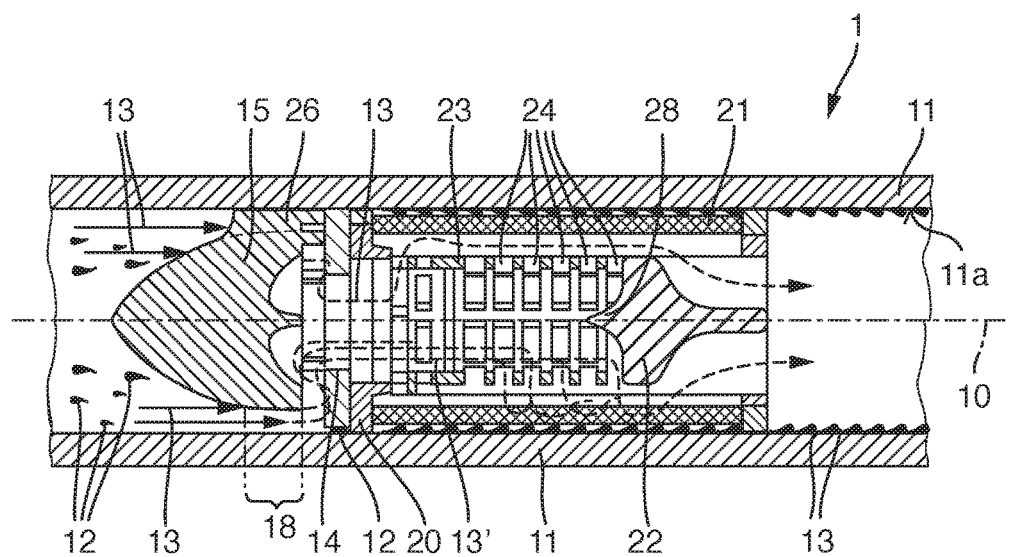
FIG. 4 is a sectional view of an example oil-separating device that includes an example flow guiding member and an example oil separation ring as a first separation stage, as well as an example redirection member and an additional oil separation member as a second oil separation stage.

Finally, FIG. 4 shows another embodiment of an oil-separating device 1 which is formed in a hollow member 11. The oil-separating device 1 has a flow guiding member 15 which is flowed against by a gas flow 13 and which is charged with droplets of oil 12. The flow guiding member 15 extends in a rotationally symmetrical manner about the longitudinal axis 10 of the hollow member 11 and is retained against the inner side 11a of the hollow member 11 by means of corresponding retention ribs 26, of which one retention rib 26 is illustrated by way of example as a cross-section at the upper side.

A flow cross-section region 18 which is formed substantially over the entire periphery around the flow guiding member 15, irrespective of the retention ribs 26, is formed between the outer side of the flow guiding member 15 and the inner side 11a of the hollow member 11. As already described in connection with FIGS. 1 and 2, the gas flow 13 is accelerated by the flow guiding member 15 into the flow cross-section region 18 and the accelerated gas flow 13 subsequently strikes an oil separation ring 14. The oil separation ring 14 has a rear-side carrier ring 20, against which the oil separation ring 14 is supported, wherein the oil separation ring 14 is formed from a nonwoven material and forms a first separation stage.

As a result of the gas flow 13 striking the oil separation ring 14 comprising nonwoven material, there is produced an impactor effect so that droplets of the oil 12 are already separated by the impactor effect at the oil separation ring 14. The separated oil 12 can travel along the inner side 11a in a downstream direction through corresponding recesses between the carrier ring 20 and the inner side 11a of the hollow member 11 in order subsequently to reach a separation opening in order to direct the oil 12 out of the hollow member 11.

The gas flow 13' redirected by the impactor effect passes through the oil separation ring 14 through an inner passage, wherein the gas flow 13 is already pre-cleaned. The pre-cleaned gas flow 13 is subsequently brought via an intermediate element 23 into operational influence with a redirection member 22 and the gas flow 13 is redirected by the redirection member 22 against another oil separation member 21. The intermediate element 23 has radial gaps 24, through which the gas flow 13 reaches the inner side of the additional oil separation member 21 which is formed in a tubular or sleeve-like manner. The redirection of the gas flow 13 radially outward is brought about by the redirection member 22 which has to this end a redirection tip 28 and the redirection tip 28 is followed by a hyperbola-like member shape of the redirection member 22 which extends in a rotationally symmetrical manner about the longitudinal axis 10 and which is formed in an integral manner with the intermediate element 23.

The gas flow 13 which reaches the inner side of the oil separation member 21 is subjected to an additional impactor effect, whereby an additional separation effect of dropletlike oil 12 is achieved so that finally the gas flow 13 which is discharged from the oil-separating device 1 at the right-hand side is cleaned in a particular manner.

The additional oil separation member 21 may also comprise a nonwoven material and the pre-cleaned gas flow 13 can simply flow against the inner side of the oil separation member 21 or even also flow through the oil separation member 21 at least with a partial gas flow. The separated oil 12 can subsequently be discharged via an oil discharge opening which is not shown.

Figure 5:
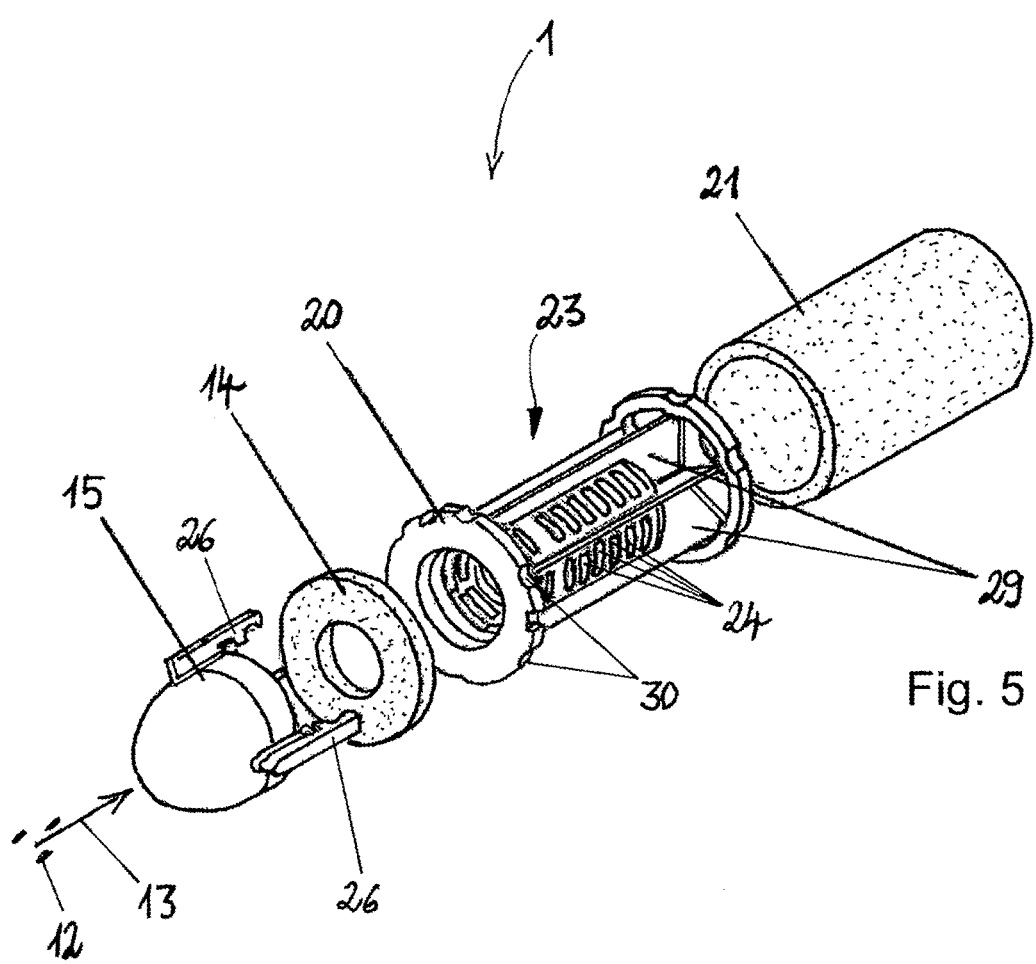
FIG. 5 is a partially-exploded perspective view of the example oil-separating device of FIG. 4.

FIG. 5 is an exploded view of components of the oil-separating device 1 in accordance with the embodiment in FIG. 4, wherein the hollow member 11 is not illustrated for greater clarity. The oil-separating device 1 is subjected to flow with the gas flow 13 and oil 12 carried thereby from an arrow direction shown so that initially the flow guiding member 15 comes into contact with the gas flow 13 and the droplets of oil 12 shown by way of example. The flow guiding member 15 is adjoined by the oil separation ring 14 which is retained at the rear side by a carrier ring 20. In this instance, the flow guiding member 15 can be clip-fitted to the carrier ring 20 with simultaneous fixing of the oil separation ring 14, for which reason the retention ribs 26 are in the form of snap-fit hooks.

The carrier ring 20 is constructed by way of example in one piece with the intermediate element 23 and the intermediate element 23 has retention walls 29 which extend in the flow direction and by which the additional oil separation member 21 can be retained against the inner wall of the hollow member which is not shown in greater detail. Consequently, a spacing between the radial gaps 24 in the intermediate element 23 and the oil separation member 21 is maintained so that the inner side of the oil separation member 21 can be subjected to flow by the gas flow 13.

At the outer side of the carrier ring 20, there are shown recesses 30 through which oil 12 which has already been separated from the gas flow 13 by the first oil separation ring 14 can continue to be directed at the outer side of the oil separation member 21.

The nonwoven material 19 does not necessarily have to touch the inner wall of the hollow member 11 but instead a gap between the outer peripheral face of the nonwoven material 19 and the inner peripheral face of the hollow member 11 may be provided.

The construction of the invention is not limited to the preferred embodiment set out above. Instead, a number of variants which also make use of the solution set out in embodiments which are of different types in principle are conceivable. All the features and/or advantages which arise from the claims, the description or the drawings, including structural details or spatial arrangements, may be inventively significant both per se and in extremely varied combinations.

The invention claimed is:

1. An oil-separating device for crankcase ventilation of an internal combustion engine having a gas flow charged with oil, the oil-separating device comprising:
    a hollow housing for receiving the gas flow in a downstream direction, the hollow housing extending axially in a longitudinal axis and including an oil separation ring;
    a flow guide that is substantially rotationally-symmetrical and is arranged in the hollow housing, the flow guide having a flow projection oriented in the longitudinal axis and a flow contour that expands radially outward in the downstream direction such that the gas flow accelerates due to flow constriction as the gas flow passes around the flow guide and approaches the oil separation ring;
    a tubular oil separation sleeve positioned in the hollow housing downstream of the oil separation ring;
    a redirection member positioned downstream of the flow guide for redirecting the gas flow against an inner side of the oil separation sleeve, the redirection member having a redirection tip and extending from the redirection tip in a substantially rotationally-symmetrical manner about the longitudinal axis; and
    an intermediate frame disposed between the oil separation ring and the redirection member, the intermediate frame having radial gaps through which the gas flow strikes the inner side of the oil separation sleeve in an accelerated manner.

2. The oil-separating device of claim 1, wherein the flow contour of the flow guide is convex.

3. The oil-separating device of claim 1, wherein the oil separation ring is formed at least partially from a nonwoven material.

4. The oil-separating device of claim 3, wherein a level of gas-permeability of the nonwoven material permits the gas flow to partially flow through the nonwoven material.

5. An oil-separating device for crankcase ventilation of an internal combustion engine having a gas flow charged with oil, the oil-separating device comprising:
    a hollow housing for receiving the gas flow in a downstream direction, the hollow housing extending axially in a longitudinal axis;
    an oil separation ring positioned inside the hollow housing, at least a portion of the oil separation ring abutting an inner face of the hollow housing, the oil separation ring having a carrier ring and a gas-permeable nonwoven material at least partially received in the carrier ring;
    a flow guide that is substantially rotationally-symmetrical and is arranged in the hollow housing, the flow guide having a trailing edge that is entirely upstream of the oil separation ring, the flow guide having a flow projection oriented in the longitudinal axis and a flow contour that expands radially outward in the downstream direction such that the gas flow accelerates due to flow constriction as the gas flow passes around the flow guide and approaches the oil separation ring;
    a tubular oil separation sleeve positioned in the hollow housing downstream of the oil separation ring;
    a redirection member positioned downstream of the flow guide for redirecting the gas flow against an inner side of the oil separation sleeve, the redirection member having a redirection tip and extending from the redirection tip in a substantially rotationally-symmetrical manner about the longitudinal axis; and
    an intermediate frame disposed between the oil separation ring and the redirection member, the intermediate frame having radial gaps through which the gas flow strikes the inner side of the oil separation sleeve in an accelerated manner;
    wherein the flow guide is separated by a minimum constriction distance from the housing inner face;
    wherein an upstream edge of the nonwoven material extends away from the housing inner face a striking distance; and
    wherein the striking distance is greater than the minimum constriction distance.

6. The oil-separating device of claim 5, wherein:
the flow contour of the flow guide is convex along a first portion of the flow guide; and
the flow contour of the flow guide is concave along a second portion of the flow guide, the second portion of the flow guide being located after the flow guide trailing edge.

7. The oil-separating device of claim 5, further comprising a plurality of retention ribs coupling the flow guide to the hollow housing.

8. The oil-separating device of claim 5, wherein the oil separation ring includes an opening for passing the oil from the nonwoven material to travel in the downstream direction along the hollow housing inner face.

9. The oil-separating device of claim 5, wherein a level of gas-permeability of the nonwoven material permits the gas flow to partially flow through the nonwoven material.

\* \* \* \* \*